Patented Mar. 7, 1939

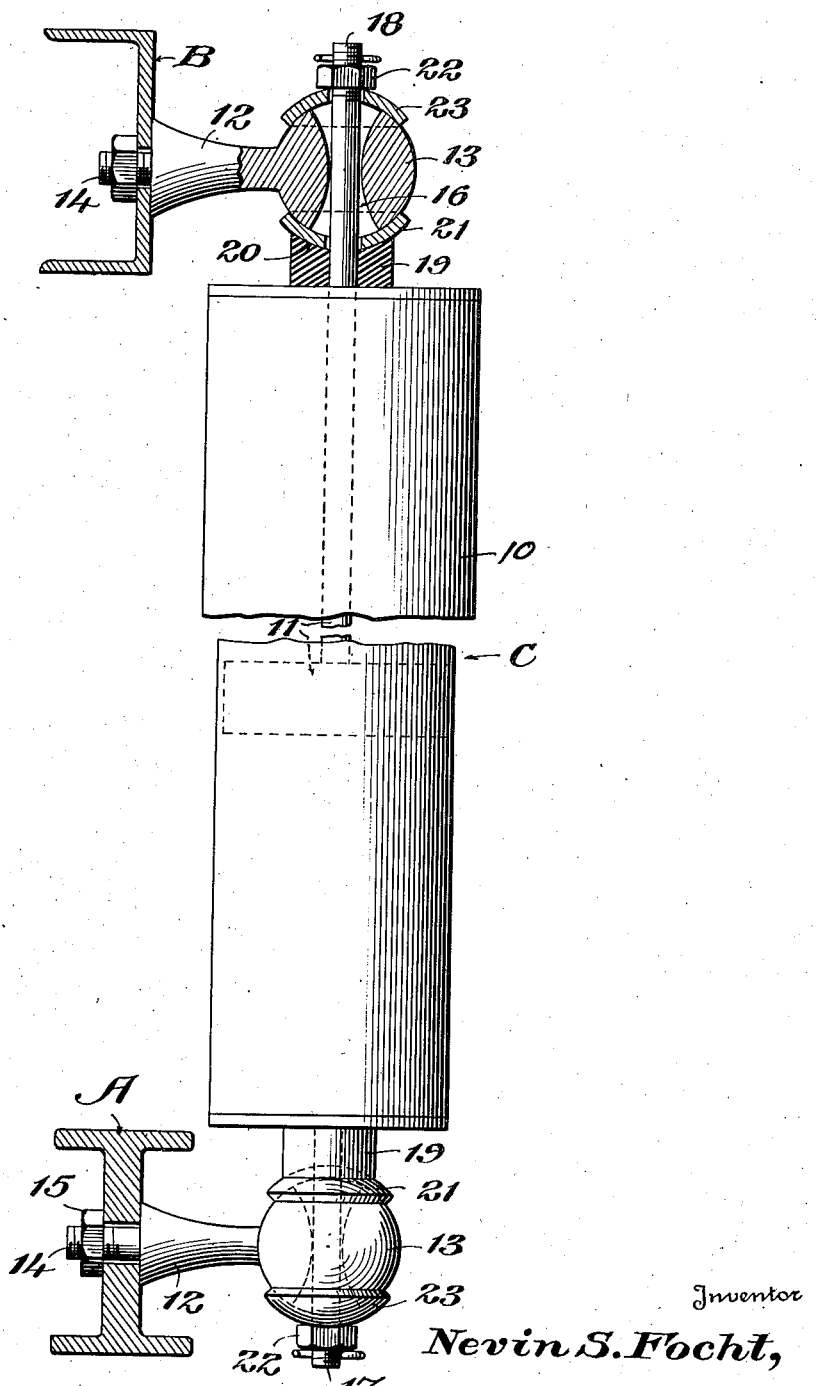

2,149,763

UNITED STATES PATENT OFFICE 2,149,763

UNIVERSAL JOINT

Nevin S. Focht, Reading, Pa.

Original application May 12, 1936, Serial No. 79,381. Divided and this application April 2, 1937, Serial No. 134,645

1 Claim. (Cl. 287—90)

This invention relates to an improved joint, capable of various different uses but specially designed for use in the mounting of shock absorbers of the cylinder and piston or strut type, and has particular reference to a joint of the character illustrated and described in my prior application, Serial No. 79,381, filed May 12, 1936, of which the present application is a division.

In the application of a shock absorber to a vehicle it is usual to pivotally connect one of the primary relatively movable elements of the shock absorber to the vehicle axle and the other to the vehicle frame, and when the shock absorber is of the elongated cylinder and piston or strut type it often is necessary, in order to preserve desired road clearance, to mount the shock absorber at an inclination to the vertical so that its lower end does not extend below the vehicle axle. In such cases pronounced pivotal movements between the shock absorber and the vehicle frame and axle occur in a vertical plane extending longitudinally of the vehicle as a result of movements of the frame and axle toward and away from each other, while lesser but still more or less pronounced pivotal movements between the shock absorber and the frame and axle occur in a vertical plane extending transversely of the vehicle as a result of relativel lateral movements between the frame and axle, as, for example, when the vehicle body sways during travel of the vehicle around a curve in a roadway, or when the wheels at one side of the vehicle encounter a road irregularity not of the same kind as is encountered by the wheels at the other side of the vehicle.

Heretofore the usual manner of pivotally connecting a shock absorber with a vehicle frame and axle was to provide a horizontally disposed stud on each of the frame and axle; to mount rubber sleeves or bushings on said studs, and to engage apertured lugs at the ends of the shock absorber over said sleeves or bushings, dependence being placed in the yieldability of the sleeves or bushings to permit pivotal movements between the shock absorber and the frame and axle in a vertical plane extending transversely of the vehicle. However, if the sleeves or bushings were sufficiently resilient to permit the necessary freedom of pivotal movement of the shock absorber transversely with respect to the vehicle, valuable control by the shock absorber of the smaller oscillations of the vehicle springs was lost due to the resilience of said bushings. On the other hand, if the sleeves or bushings were of lesser resilience so as not to interfere with control of the smaller oscillations of the vehicle springs by the shock absorber, they necessarily were relatively hard and subject to rapid wear and, moreover, were the cause of the setting up of severe, damaging and dangerous stresses in the shock absorber.

Accordingly, the object of the present invention is to provide a joint of the ball and socket type, devoid of disadvantageous rubber sleeves or bushings, especially adapted and designed for the mounting of shock absorbers so as to permit free pivotal movements of the same in vertical planes extending both longitudinally and transversely of a vehicle, and so constructed as to be of low production cost, to permit quick and easy mounting and de-mounting of a shock absorber to have long life and to perform efficiently and satisfactorily in service.

With the foregoing and other objects in view, which will become more fully apparent as the nature of the invention is better understood, the same consists in the novel features of construction, combination and arrangement of parts as will be hereinafter more fully described, illustrated in the accompanying drawing and defined in the appended claim.

In the drawing, the figure is a side elevation of a shock absorber shown mounted between a vehicle frame and axle by means of a pair of the present joints, one of the joints being shown in side elevation and the other in vertical section.

Referring to the drawing in detail, A designates a portion of a vehicle axle, B designates a portion of the vehicle frame, and C designates, generally, a shock absorber of the cylinder and piston or strut type interposed between said axle and frame and having its cylinder 10 and its piston and piston rod assembly 11, constituting its primary relatively movable elments, connected to said axle and frame, respectively, by means of a pair of the present joints.

Each joint comprises a mounting pin 12 provided at its outer end with a spherical formation 13 and formed at its inner end with a stud 14 to be passed through an opening in an axle or frame part and to have a nut 15 threaded thereon to rigidly secure the pin to the axle or frame part, as the case may be.

Formed centrally through the spherical formation 13 is a hole 16 which is of circular shape in cross section and of least diameter midway between its ends; i. e., at the middle of said spherical formation, and which flares from its middle to each of its ends in a regular convex curve.

One pin 12 is fastened to the vehicle axle and another is fastened to the vehicle frame with their holes 16 axially alined and having extending therethrough, respectively, rods 17 and 18 of which one is rigid with the shock absorber cylinder and the other is comprised by, or is rigid with, the shock absorber piston rod.

Surrounding each rod 17 and 18 between the related spherical formation 13 and the related shock absorber element is a block 19, preferably of rubber or other resilient material, but which may comprise either an integral part of the related shock absorber element or a part separate from and seated against the related shock absorber element. In either case the outer end of each block 19 is formed with a concave spherical seat 20 and there is interposed between each block and the related spherical formation 13 a spherical washer 21 which, at its convex side, seats against the seat 20 of the related block 19 and, at its concave side, seats against the related spherical formation 13.

The washers 21 have central holes of substantially the same diameter as the rods 17 and 18 and through which said rods extend so that the related ends of the holes 16 of the spherical formations are closed and the washers are slid relative to said spherical formations when the rods 17 and 18 are swung relative to said formations.

Each rod 17 and 18 is of a diameter to snugly fit the middle portion of the hole 16 of the related spherical formation 13 and extends entirely through said hole and has threaded on its outer end a nut 22. Moreover, there is engaged on each rod between its nut 22 and the related spherical formation 13 a spherical washer 23 which is a duplicate of the related washer 21 and which serves to close the outer end of the hole 16.

The nuts 22 are tightened sufficiently to maintain the parts comprising each joint in snug assembly, yet not so tightly as to interfere with free swinging movements of the rods 17 and 18 relative to the spherical formations 13 as permitted by the flared form of the holes 16. Consequently, the shock absorber is permitted to swing at each end in any direction relative to its mounting pin. At the same time, each joint is unyielding in any way such as would result in loss of control by the shock absorber of even the smallest oscillations of the vehicle springs.

The holes 16 may be filled with lubricant which will be retained in said holes by the washers 21 and 23, since said washers are of sufficient diameter to maintain the ends of said holes covered in any extreme swung position of either rod 17 or 18 relative to its related spherical formation 13.

While the invention has been described in connection with a shock absorber of a particular type, it is apparent that the same is not restricted to use for mounting shock absorbers, but may be used wherever it may be advantageous.

I claim:—

A joint of the character described comprising a pin, means for securing said pin rigidly to a support, a spherical formation on said pin having a hole formed therethrough, said hole being of circular shape in cross section and being flared from its middle to its ends, a rod of substantially the same diameter as the middle portion of said hole extending through said hole, spherical washers on said rod at opposite ends of said spherical formation, a member from which said rod extends, a block between said member and the adjacent washer, and a nut on the free end of said rod holding the parts of the joint in snug assembly.

NEVIN S. FOCHT.